United States Patent
Terranova et al.

(10) Patent No.: US 10,464,462 B2
(45) Date of Patent: Nov. 5, 2019

(54) MULTI PURPOSE ARMRESTOR

(71) Applicants: Robert Terranova, Jackson, NJ (US); Diana Terranova, Jackson, NJ (US)

(72) Inventors: Robert Terranova, Jackson, NJ (US); Diana Terranova, Jackson, NJ (US)

( * ) Notice: Subject to any disclaimer, the term of this patent is extended or adjusted under 35 U.S.C. 154(b) by 389 days.

(21) Appl. No.: 14/121,921

(22) Filed: Nov. 4, 2014

(65) Prior Publication Data
US 2016/0121768 A1     May 5, 2016

(51) Int. Cl.
*B60N 3/10* (2006.01)
*B60N 2/75* (2018.01)

(52) U.S. Cl.
CPC .............. *B60N 3/103* (2013.01); *B60N 2/787* (2018.02); *B60N 2/793* (2018.02)

(58) Field of Classification Search
CPC .. B60N 2/4673; B60N 2/4686; B60N 2/4653; B60N 2/4646; B60N 2/4666; B60N 3/103
USPC .......................................................... 296/153
See application file for complete search history.

(56) References Cited

U.S. PATENT DOCUMENTS

| | | | |
|---|---|---|---|
| 1,374,907 A | 4/1921 | Cofrode | |
| 4,592,584 A | 6/1986 | White, Jr. | |
| 4,877,284 A | 10/1989 | Doane | |
| 4,907,835 A | 3/1990 | Salters | |
| 5,004,292 A | 4/1991 | Horne | |
| 5,096,152 A * | 3/1992 | Christiansen | B60N 2/4606 224/275 |
| 5,205,606 A | 4/1993 | Cassese | |
| 5,232,190 A | 8/1993 | Gould | |
| 5,320,401 A | 6/1994 | Ott | |
| 5,332,288 A | 7/1994 | Coates | |
| 5,730,491 A * | 3/1998 | Carlsen | B60N 3/083 297/188.19 |
| 6,419,379 B1 * | 7/2002 | Hulse | B60N 2/4686 362/154 |
| 2014/0132046 A1 * | 5/2014 | Driscoll | B60N 2/4666 297/188.18 |

* cited by examiner

*Primary Examiner* — Joseph D. Pape

(57) ABSTRACT

A universal arm rest device that rest upon the vehicle door/window panel containing various part features for convenience and various functional capabilities for device usage. The universal arm rest device has an adjustable cushioned pad and for users comfort positioning and provides capability of placing the Universal arm rest along any point of the vehicle door panel. Various capabilities include the adjustability and portability of its cup/bottle/cell phone holder for easy access and tissue and coin holders for convenience, organization and comfort.

14 Claims, 25 Drawing Sheets

12A

12 B

MULTI PURPOSE ARMRESTOR

FIELD OF THE INVENTION

The present invention relates to a universal arm rest arm resting device and, more particularly, to an arm resting device universally adaptable to all vehicle types which can attach itself and ergonomically fit to any vehicle's individually shaped door/window panel, thus allowing for simplified use.

BACKGROUND OF THE INVENTION

While many attempts have been devised to incorporate such a device with nonrestrictive conditions, many lack the properties to rest or position an arm on the sill of any type vehicle, with the choice of having the window raised or lowered; portable in use; reversible in its application; easy to install; novel in its mating parts applicability; and its ability to contour additional features and functions. While each of those prior art designs may be used as an arm vehicle rest, each lack the unique design configuration of the present invention.

The U.S. Pat. No. 5,320,401 discloses a vehicle arm rest that latches to the underside of a door panel between the window and panel weather stripping by use of a strap with projections which leans against the interior of a door panel. Other similar devices have been proposed with varied attaching methods. There are apparent drawbacks to these types of devices. The majority of vehicles are excluded from the use of such devices. The designs of the prior art do not accommodate a variety of vehicles and vehicle types as such prior art designs fail to provide means for an adjustable latch system to properly fit to the door pane or flush or level their frames against the interior door/window panel due to the vast variation in contours, thickness and geometric shapes. The properties of these other devices, claiming to insert their elements in between the window and stripping, limit their applicability. There exist prior art designs only to be used when the window is fully opened and can only be attached in this position. Others have elaborated from this and shown such a device that can be attached to the interior door panel with a window in a raised or lowered position. In all, existing prior art designs lack an application for a latching system that expands and contracts, allowing to fit universally to all vehicle type door panels with no restrictions, thus allowing for a contoured fit to the interior of the vehicle.

The clear drawbacks are the absence of a reversible product amenable to all sides of a vehicle's interior; the ability to incorporate attaching features for multi related purposes, such as a portable cup holder with ability to detach, swivel, lock and adjust; and an adjustable pad for end users comfort and convenience, and proper positioning to the door. Other such drawbacks are present, such as the lack of other fashionable properties that are not readily available in motor vehicles: features such as a coin dispenser and tissue compartment, configured to the main housing; as well as an expanding and contracting latching system, allowing universal attachment to all vehicle types, with no restrictions to varying door panels.

In the relative field of the inventions, other differences become apparent, such as: a reversible, adjustable, and slidable arm rest pad that can preposition along the longitude of the main body frame, thereby allowing convenience and distal use for end user's comfort, and allowance for expedient engagement or disengagement of the rest pad. A further clear difference is the main unit itself; it has the adaptability to fit on any vehicle by use of its main unit's ergonomically design and distinctive adjustable mount/hook, thus not requiring outside materials or tools for assembly or installation. The relative parts of the current design allow the entire unit by its mere attaching elements, via, the adjustable mount/hook, to be non-permanently position along the longitude of the door plane-easily disengaged or repositioned from or on its plane- and allowance for any longitude positioning to avoid any obligatory objects on a door-door knobs/door handles. The current design's main unit concomitant with the adjustable mount/hook, provides further enhancement features not seen in the other devices; the latitude height adjustment of the main body unit, allowing adjustment of the pad area to the end-users height comfort, perpendicular to the plane of the door panel.

Other prior art designs in this field of invention are very dissimilar and become apparent when considering the art of the present invention. The current invention offers a new approach to its manufacturing with its mating parts, by avoiding the need for special connective tools for assembly or required installation by a third party provider, not seen in the other patents. The prior art designs either require the end user to apply or use a tool or some sort of taping mechanism, or screws. The final drawbacks to the other prior art designs are their apparent protuberant apparatus, interfering with the interior space of a vehicle. Other obvious benefits the other prior art designs lacks, and of which the present invention overcomes, is the versatility of having both a tissue and coin dispensers. The more obvious difference with the current invention is the slidable pad, allowing the base frame to be prepositioned anywhere along the door pane. And the final advantage that other prior inventions do not conceptualize, is the future use and adaptability: the ability of the unit to foresee future added features or accessories, easily added to the current invention via separate attachments to the cup chamber compartments, or use of attachment to the tracking system.

In accordance with the present invention, several objects and advantages of the invention are apparent from the ensuing description and accompanying drawings. The various parts are integrally and keenly designed into the embodiment of the main body unit delineating the process of time, cost, and materials needed in other manufacturing processes. The invention and its parts are harmoniously mated in a novel design, easily transitioning in the connectivity of its parts, thus abrogating the need for any interior or exterior connection materials. The arm rest pad allows sliding capacity for consideration of end users comfort and positioning on the door pane. The unique hook mount and main body unit incorporates elements not conceptualized in prior or similar devices. The part serves to allow usage on all motor vehicles regardless of a vehicle's door panel design, shape or matter of construction, as well as the allowance to place the invention discriminately and with ease, along the latitude plane of the door pane. Further advantages are palpable in its design and usage—the pad allows to rest one's arm within any vehicle; the portability and ease of freely mounting and dismounting the main unit housing; the reversible feature, allowing use on any door; the ability to adjust at varied height angles, and manufactured with readily available materials at an economical cost. Still further objects and advantages will become apparent from a consideration of the ensuing description and accompanying drawings.

SUMMARY OF THE INVENTION

The invention is relative to a functional vehicle utility device for the commodious arm resting within any vehicle type, offering motorist the convenience of coin and tissue storage and dispensing, and swiveling cup holder. The invention provides features that are reversible and easily mounts and dismounts. Its distinct geometric shape and design allows adjustability at varied angles, heights, and portability. The Invention solves various mounting problems such as different sizes and shapes of various door/window panels, foreign and domestic alike, with its adjustable mount/hook mechanism, and allows the attachment along the sill of the window for resting of an arm, with the window opened or closed. The Invention provides proper and secure fitting, and offers a slidable arm rest pad at a horizontal plane, giving the motorist the comfort of placing the Invention far or near for its use. The design, features and benefits in total, provide the basis for overcoming these obstacles as opposed to other arm rests of the prior art.

BRIEF DESCRIPTION OF THE DRAWINGS

A complete understanding of the present invention may be obtained by reference to the accompanying drawings, when considered in conjunction with the subsequent, detailed description, in which.

REFERENCE NUMERALS

Figure 1:
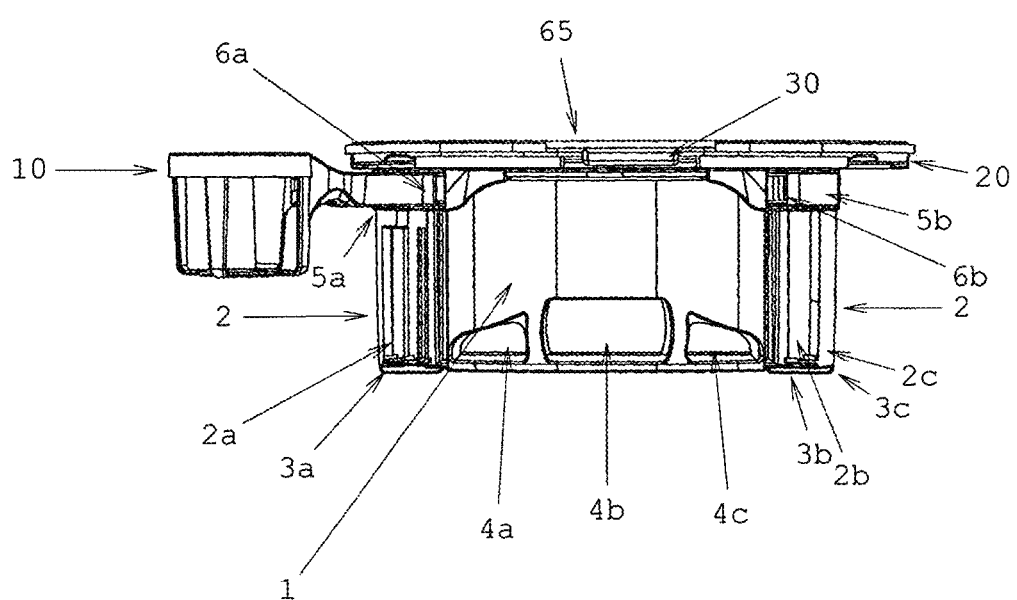
FIG. 1 is a front plan view of the main body of the armrestor that which faces the inner door panel.

1) Main Body
2) Coin Dispensers
2a) Quarter dispenser
2b) Dime Dispenser
2c) Nickel Dispenser
3a) Quarter coin mouth
3b) Dime coin mouth
3c) Nickel coin mouth
3d) Cylindrical/Pucks
3e) Spring coil
4a) left side aperture
4b) Middle aperture
4c) Right side aperture
5a) left side cupholder chamber
5b) Right side cupholder chamber
6a) Left Side Buckle Belt Spring Lock
6b) Right Side Buckle Belt spring lock
7a) left side latch hook
7b) Right side latch hook
8a) Left side cylindrical aperture
8b) Right side cylindrical aperture
9a) left side recessed grooves
9b) Right side recessed grooves
10) Cup holder
11) Arm extension with exterior and interior inner casings
12) Peripheral ribbed edge
13) Inner flexible arm
14) Center push button
15) Hinged ribbed bottle neck
16) Holding apparatus
20) Slidable Pad deck
21a) Left side boring
21b) Middle boring
21c) Right side boring
22) Honey comb structure
23a) left side track chamber
23b) left underside concealed hinge
23c) Right side track chamber
23d) Right underside concealed hinge
24) Receiving platform
24a) Left Pin
24b) Right pin
26) Push Button Plate cover
26a) Left boring
26b) right boring
30) Pad deck lock and release Push button
30a) overhang hinge
30b) Grooved Teeth 30c) Spring
40) Main body top platform
40a) Embossed Grooved track
40b) Embossed Non grooved track
40c) Grooved track overhang hinge
40d) Non Grooved track overhang hinge
51) Bending plate
51a) Push button
51b) Flange
52a) Left side buttressed parallel support column
52b) Right side buttressed parallel support column
53a) Left side support wall base
53b) Center support wall base
53c) Right side support wall base
54) Tissue holding compartment
60) Pad plate
60a) Left side pin
60b) Center pin
60c) Right side pin
65) foam insert and pad plate covering
70) Adjustable Mount/hook
70a) Left side wing edge
70b) Right side wing edge
70c) Locking teeth
70d) recessed pit
70e) Blade For purposes of clarity and brevity, like elements and components will bear the same designations and numbering throughout the Figures.

DESCRIPTION OF THE PREFERRED EMBODIMENT

Figure 19:
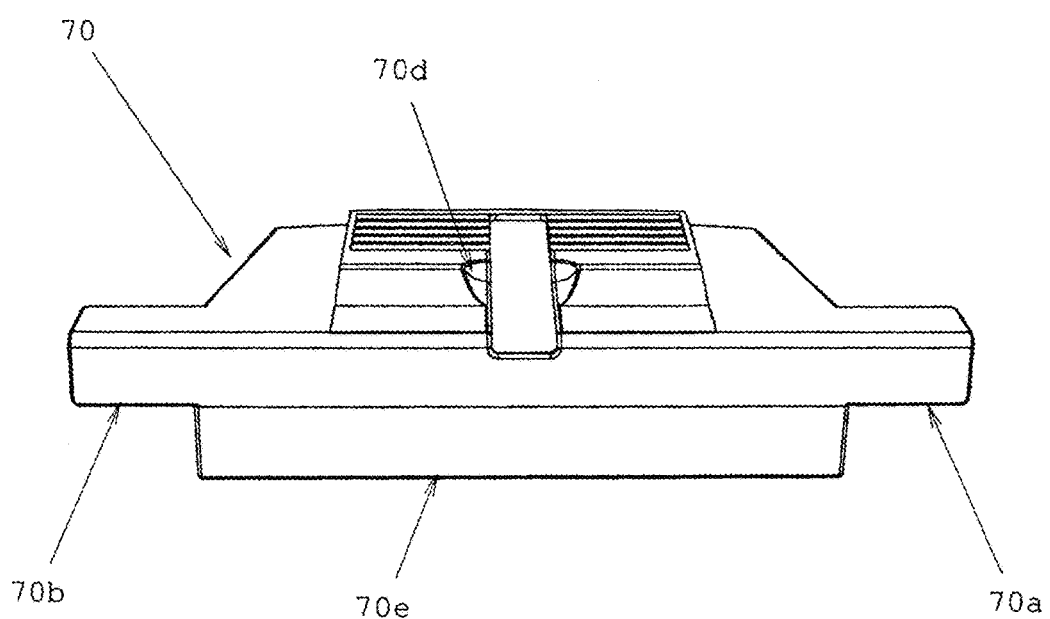
FIG. 19 is a rear perspective with top offset view of the main body.

FIG. 1 is a front plan view of the universal arm rest's main body 1 that which faces the inner door panel. The main body 1 can be configured in variant dimensional sizes and not held specifically to certain x, y, & Z dimensions. Its material composite is not limited to the scope defined but is considered to be more appropriately composited of materials in the polystyrene family, namely either in H.I.P.S (High Impact Polystyrene) and or confluence of nylon composite. Both these elements afford the best practical method for achieving durability and strength in meeting the rigid aspects of wear and tear, weather tolerance, and scratch resistance. The main body 1 houses many component capabilities, designed to achieve maximum comfort and convenience which is described as the following: coin dispensers 2 molded to the frame of the main body 1, located at the perimeter end of its frame, consist of a quarter dispenser 2a, nickel dispenser 2c and dime dispenser 2b, each having a molded compartment to store the exact dimensional size of its respective coinage, with each coin dispensers 2 having at its rigid ends, a quarter coin mouth 3a, nickel coin mouth 3c, and dime coin mouth 3b for dispensing the coins. Each respective coin dispensers 2; namely, quarter dispenser 2a, nickel dispenser 2c, and dime dispenser 2b, have shaped cylindrical pucks 3d as shown in FIG. 19, attached to a spring coil 3e placed within the respective coin dispenser compartment to compress the coins and enforce stability of the coinage for proper dispensing out from the quarter coin mouth 3a, nickel coin mouth 3c, and dime coin mouth 3b. Additional convenience is conveyed by molding into the back frame of the main body 1 a tissue holding compartment 54 (FIG. 19) for storing tissues. Tissues are easily dispensed by appropriately configuring a left side aperture 4a, middle aperture 4b, and right side aperture 4c for easy access to the tissues, primarily dispensed through the middle aperture 4b. The middle aperture 4b, known as the dispensing window, allows a dispensement of a single play tissue which consist of either the small portable standard Kleenex pack or individual large ply, easily placed in the tissue holding compartment 54, which is held in place by a left side support wall base 53a, center support wall base 53b, and right side support wall base 53c (FIG. 19). Each of the wall bases depicted in (FIG. 19) prevents the storage of packaged tissues from displacement. The center support wall base 53b is proportionately higher in height to its corresponding left side support wall base 53a & right side support wall base 53c to prevent the stored tissue pack from tilting or falling from its access point—known as the middle aperture 4b. After storing the pack of tissue, simply by pulling one of its individual ply through the middle aperture 4b, the remaining ply's will automatically be present through such aperture. Cup holder 10 attaches to chambers 5a and 5b which are perimetrically framed to allow both a left side chamber 5a and a right side chamber 5b, for reversible attachment of the cup holder 10. The drawing further details the main body 1, connectively joins a slidable pad deck 20, atop the main body top platform 40 (FIG. 8) forming the basis of a cushioned pad—by way of a foam insert and pad plate covering 65, for flexible comfort to rest one's arm in multiple fashions.

Figure 2:
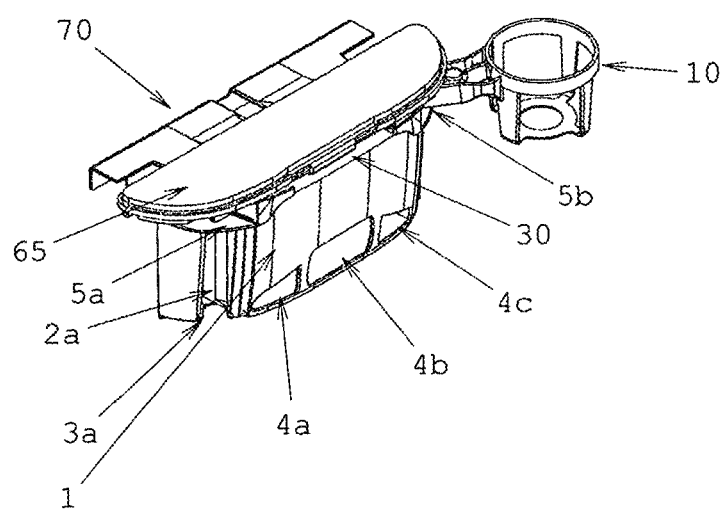
FIG. 2 is a perspective view of the main body of the armrestor with fully assembled components.
Figure 15:
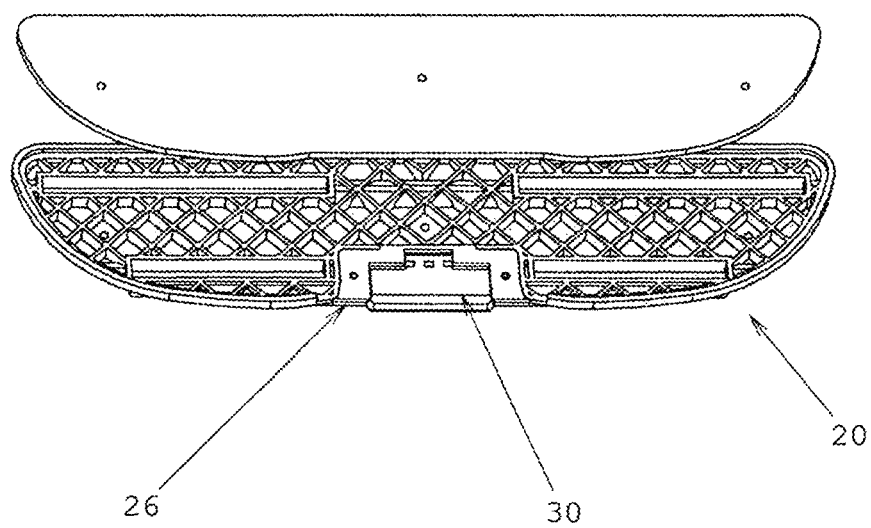
FIG. 15 A-B are an exploded view with an overlay view of the mating of grooved teeth of the pad deck lock and release push button to embossed grooved tracking of the top platform.

FIG. 2 is a perspective view of the main body 1 with fully assembled components. FIG. 2 illustrates and depicts how the main body 1 house exterior attachable components. In the respective view, the quarter dispenser 2a and quarter coin mouth 3a are shown, giving more definition of how the coin is release from the bottom of its molded compartment. The right side cup holder chamber 5b illustrates the easy attachment of the cup holder 10 to the right side of the main body 1, and the ability of the cupholder 10 to attach easily to the left side chamber 5a. The illustration of this view clearly demonstrates the reversibility of having the cup holder 10 on either side-left or right, allowing the main body 1 features to be reversible when placed on any one door panel within a vehicle. The illustration of the tissue compartment clearly demonstrates the understanding in the method used to access the stored tissues. Left side aperture 4a, middle aperture 4b, and the right side aperture 4c are the access points for dispensing, more specifically, the usage of the middle aperture 4b. The foam insert and pad plate covering 65 (FIG. 17), made of cotton, leather and/or other commonly used fibers types, covers the foam insert, illustrates its relationship to the main body 1 and gives the perspective of its functional use when used inside a vehicle, and provides a closer look at the feature of the pad deck lock and release push button 30 and its proximal relationship to the slidable pad deck 20 (as shown in FIG. 15 A & B). The adjustable mount/hook 70 clearly defines its relationship as an exterior component to the main body 1 and accentuates its functionality and use.

Figure 3:
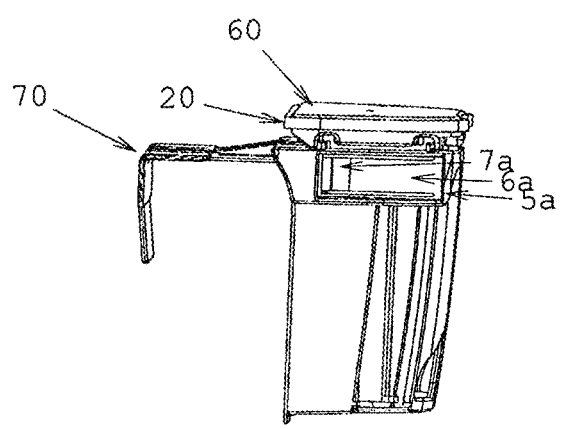
FIG. 3 is a left elevation view of the attached adjustable mount/hook and pad deck with pad plate as shown in FIGS. 1 and 2.

FIG. 3 is a left elevation view of adjustable mount/hook 70, and slidable pad deck 20 with pad plate 60 as shown in FIGS. 1 & 2. The depiction of the pad plate 60 illustrates its relationship to the slidable pad deck 20, centered horizontally, mating both parts. The pad plate 60, prior to it's mating, will be assembled with foam, covered with an outer layer of material, thereby creating a pad, as configuratively described in FIG. 18. The slidable pad deck 20 is attached to and rests upon the main body top platform 40. The adjustable mount/hook 70 hinged to the main body 1, illustrates a closer view of its mating and attachment relationship. FIG. 3 also illustrates the left side cup holder chamber 5a and co-components: left side buckle belt spring lock 6a and left side latch hook 7a, as discussed in FIG. 4.

Figure 4:
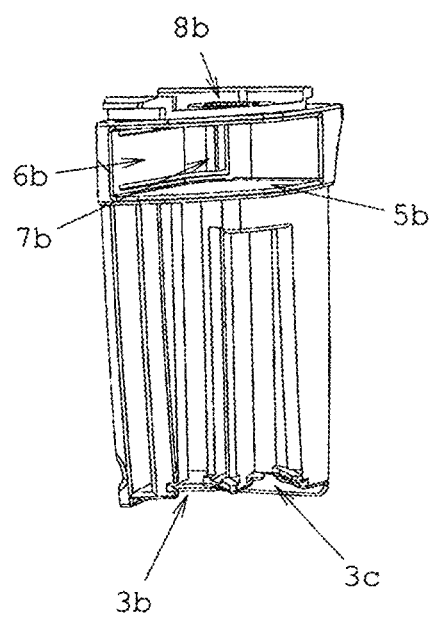
FIG. 4 is a right elevation view of the main body of the armrestor as represented in FIG. 1.
Figure 6:
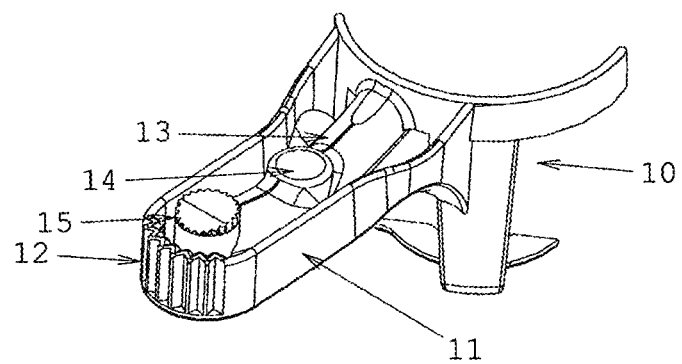
FIG. 6 is a perspective view of the cup holder.

FIG. 4 which is a right elevation view of the main body 1 as represented in FIG. 1. The right side chamber 5b, identical to its left side chamber 5a (FIG. 3), both house the components necessary to effectuate the mating and assembly of the cup holder 10 with use of its elements molded to the arm extension with exterior and interior inner casings 11 (FIG. 6). In this view, the right side buckle belt spring lock 6b is located within the right side chamber 5b, made of a flexible beam, allowing movement when the cup holder 10 is mated, effectuated by its cut away form which has a right side latch hook 7b distal to its base, for grasping the peripheral ribbed edge 12 (FIG. 6) of the cup holder 10. Upon the right side latch hook 7b grasping the peripheral ribbed edge 12, activates the preset locking positions as the right side latch hook 7b moves in between the grooves of the peripheral ribbed edge 12, thus aiding in the swivel action. The right side cylindrical aperture 8b, molded into the main body 1, perpendicular to the right side cup holder chamber 5b, when connected to the hinged ribbed bottle neck 15 (FIG. 6), provides the additional support to keep in place the cup holder 10, stable, in position, and attached to the right side latch hook 7b, thereby allow for the sturdy swivel action. The hinged ribbed bottle neck 15 located atop the inner flexible arm 13, inserts into the right side cylindrical aperture 8b by depressing the center push button 14 of the inner flexible arm 13. Once depressed, the hinged ribbed bottle neck 15 will fit into the right side cylindrical aperture 8b and hold in place and provide the cupholder 10, swivel support in variant degrees. The hinged ribbed bottle neck 15 contains a ribbed structure that mates with the right side recessed grooves 9b(FIG. 8) of the right side cylindrical aperture 8b, making a flexible but rigid connection, offering notch swivel movement in unison with peripheral ribbed edge 12. As the cupholder 10 is adjusted to swivel, the connective parts: the peripheral ribbed edge 12, hinged ribbed bottle neck 15, move in unison to its respective connective parts: right side latch hook 7b and the right side cylindrical aperture 8b. Alternatively, the hinged ribbed bottle neck 15 can also have elements of a non-ribbed structure that can mate with right side cylindrical aperture 8B, also having a non-recessed grooves, that can provide the cup holder 10 to allow swivel action in variant degrees. Variant degrees of swivel motions are present when preset locking positions are still effective by the right side buckle belt spring lock 6B grasping the peripheral ribbed edge 12 of the cup holder 10.

The same elements apply to the Left side chamber 5a, housing the components to effectuate the mating and assembly of the cup holder 10 and its components. In (FIG. 3), there exist a left side buckle belt spring lock 6a, a flexible beam allowing for movement when the cup holder 10 is mated, having a left side latch hook 7a distal to its base, for grapping the peripheral ribbed edge 12 (FIG. 6) of the cup holder 10 for allowing the locking positions as the left side latch hook 7a moves in between the grooves of the peripheral ribbed edge 12, activating the preset locking positions as the left side latch hook 7a moves in between the grooves of the peripheral ribbed edge 12, thus aiding in the swivel action. The left side cylindrical aperture 8a, molds into the main body 1, perpendicular to the left side chamber 5a, when connected to the hinge ribbed bottleneck 15, provides the additional support to keep the cup holder 10, stable, in position, and attached to the left side latch hook 7a, allowing for the sturdy swivel action. The hinged ribbed bottle neck 15, attaches identically to the left side cylindrical aperture 8a by depressing the center push button 14 of the inner flexible arm 13. Upon depression, the hinged ribbed bottle neck 15 will fit into the left side cylindrical aperture 8a and hold in place and provide the cupholder 10 to swivel at variant degrees. The hinged ribbed bottle neck 15 contains a ribbed structure that mates with the left side recessed grooves 9a (FIG. 8) of the left side cylindrical aperture 8a, making a flexible but rigid connection, offering notch swivel movement in unison with the peripheral ribbed edge 12. As the cupholder 10 is adjusted to swivel, the connective parts: the peripheral ribbed edge 12, hinged ribbed bottle neck 15, move in unison to its respective connective parts: left side latch hook 7a and the left side cylindrical aperture 8a. Alternatively, the hinged ribbed bottle neck 15 can also have elements of a non-ribbed structure that can mate with left side cylindrical aperture 8A, also having a non-recessed grooves, that can provide the cup holder 10 to allow swivel action in variant degrees. Variant degrees of swivel action are present when Preset locking positions are still effective by the left side buckle belt spring lock 6A grasping the peripheral ribbed edge 12 of the cup holder 10.

Figure 5:
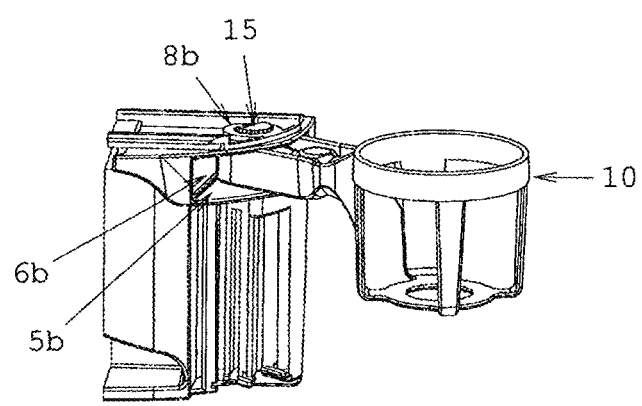
FIG. 5 is a broken view of a right side chamber with attached cup holder.

FIG. 5 is a broken view of the main body 1, illustrating the attached cupholder 10 to the right side chamber 5b and mechanical elements for attachment: hinged ribbed bottle neck 15, right side chamber 5b, right side buckle belt spring lock 6b, and right side cylindrical aperture 8b by which its referenced in previous section under FIG. 4.

FIG. 6 which is a perspective view of the cup holder 10 illustrating its mechanical elements for attachment and swivel action when mated to either the left side cupholder chamber 5a or right side cupholder chamber 5b which depicts the inner flexible arm 13, proximal to the arm extension with exterior and interior inner casings 11, and respective elements: peripheral ribbed edge 12, center push button 14, and hinged ribbed bottle neck 15 as described in FIG. 4.

Figure 7:
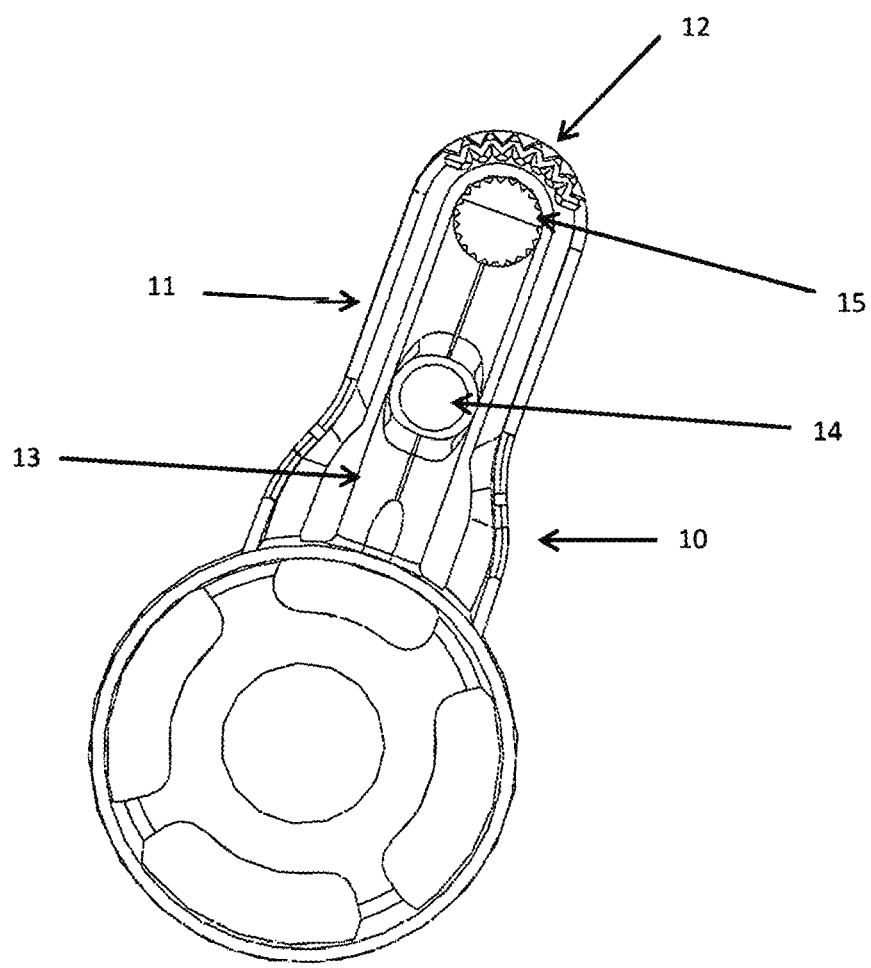
FIG. 7 is a top elevation view of a FIG. 5.

FIG. 7 is a top elevation view of FIG. 5, showing the cup holder 10 and perspective details of the elements: (arm extension with exterior and interior inner casings 11, peripheral ribbed edge 12, inner flexible arm 13, center push button 14, and hinged ribbed bottle neck 15) as indicated in (FIGS. 4 and 5).

Figure 8:
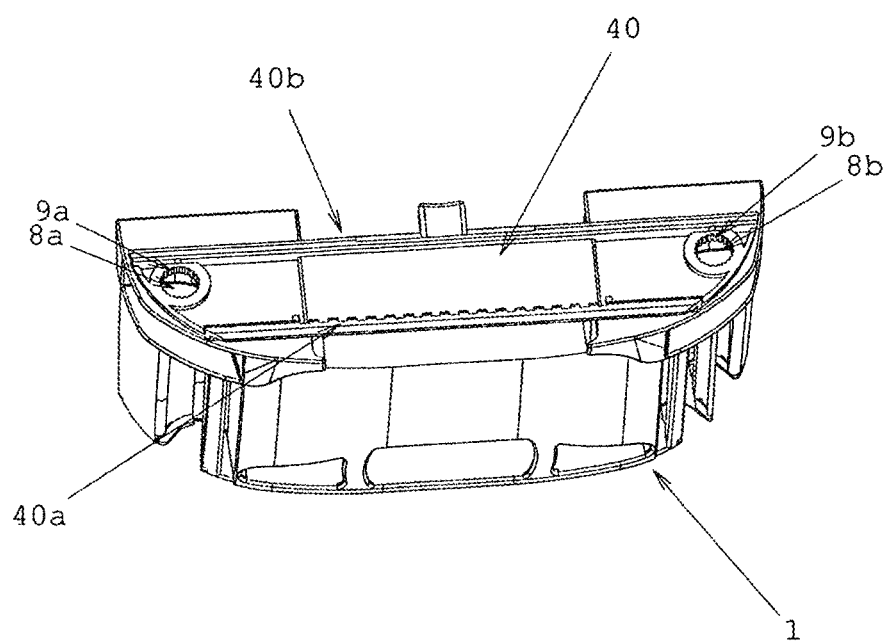
FIG. 8 is a top detail view of the main body prior to connecting pad assembly as shown configuratively in FIGS. 1 and 2.

FIG. 8 which is a top detail view of the main body 1 delineating the connective parts of the slidable pad deck 20 and cup holder 10 as configuratively shown in FIGS. 1 and 2. The main body top platform 40 houses molded integral tracks for receiving the slidable pad deck 20. The embossed grooved track 40a and the embossed non grooved track 40b allow mating to the underside of the slidable pad deck 20 as shown in (FIGS. 9 & 10) for connective purposes of the arm pad which consists of the slidable pad deck 20, pad plate 60 and foam insert and pad plate covering 65 (FIGS. 1, 11, and 17 respectively) to rest to the main body top platform 40.

Figure 9:
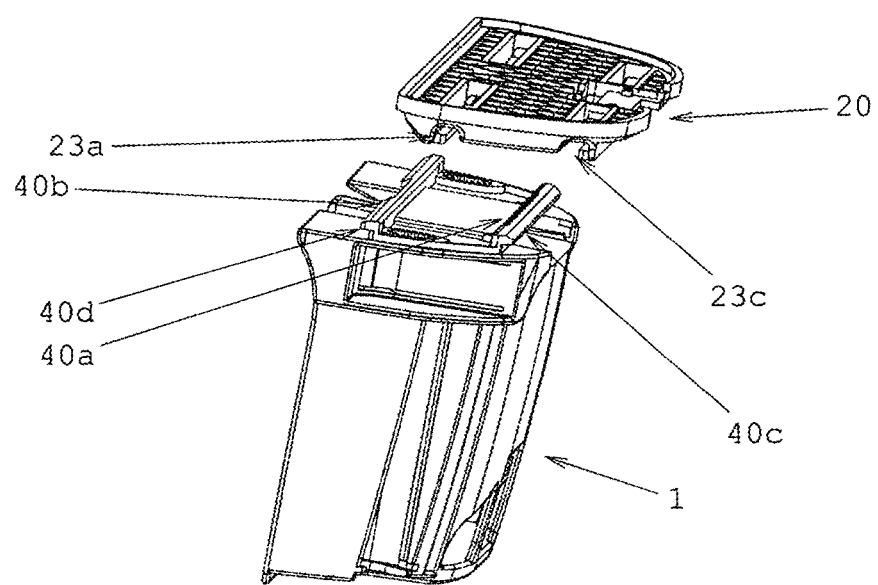
FIG. 9 is an exploded perspective view of the top main body mating with pad deck as shown configuratively in FIG. 1 and FIG. 2.

FIG. 9 is an exploded perspective view of the top main body 1 illustrating the mating of the slidable pad deck 20 shown configuratively in FIGS. 1 & 2. The slidable pad deck 20 underside contains a left side track chamber 23a and right side track chamber 23c which line up and connect into the respective embossed grooved track 40a and the embossed non grooved track 40b by sliding the left side track chamber 23a and right side track chamber 23c into the dual tracks {known as 40a; 40b}, allowing the slidable pad deck 20 to sit upon the embossed grooved track 40a and embossed non grooved track 40b (described as dual tracks). The left side track chamber 23a and right side track chamber 23c house a left underside concealed hinge 23b and a right underside concealed hinge 23d (FIG. 10), meshed to the underside of the slidable pad deck 20. Sliding the left underside concealed hinge 23b and the right underside concealed hinge 23*d* into the grooved track overhang hinge 40*c* and the non-grooved track overhang hinge 40*d*, connectively holds the slidable pad deck 20, enabling the slidable pad deck 20 to slide and move freely upon the described dual tracks (known as 40*a* & 40*b*).

Figure 10:
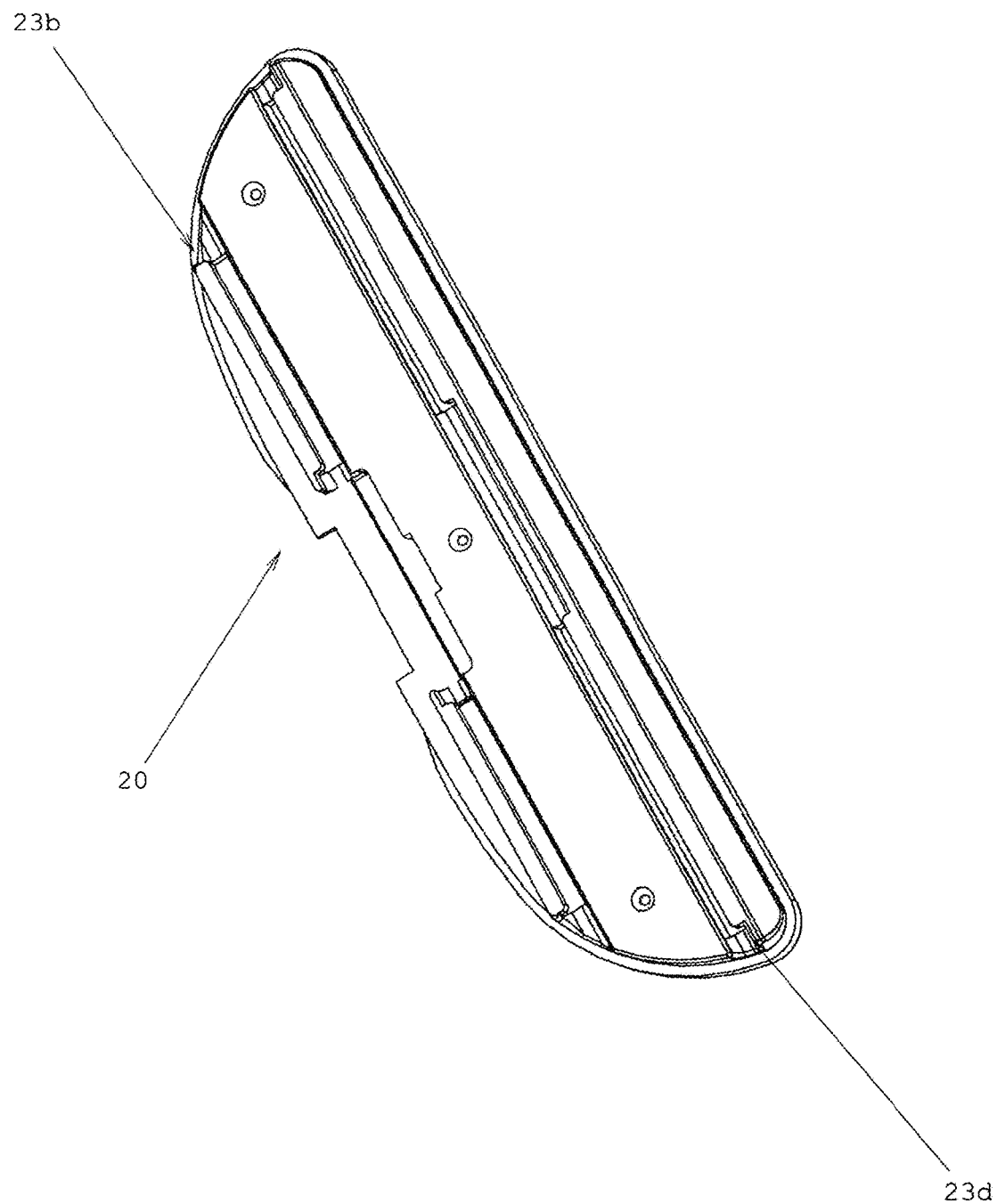
FIG. 10 is a rear perspective view of the pad deck.

FIG. 10 which is a rear perspective view of the slidable Pad Deck 20, indicative of the elements described in FIG. 9. As shown, the Left underside concealed hinge 23*b* and right underside concealed hinge 23*d* depict the hinge effect for holding the slidable pad deck 20 into place upon the embossed grooved track 40*a* and embossed non grooved track 40*b*, that enables the motion for slidable action.

Figure 11:
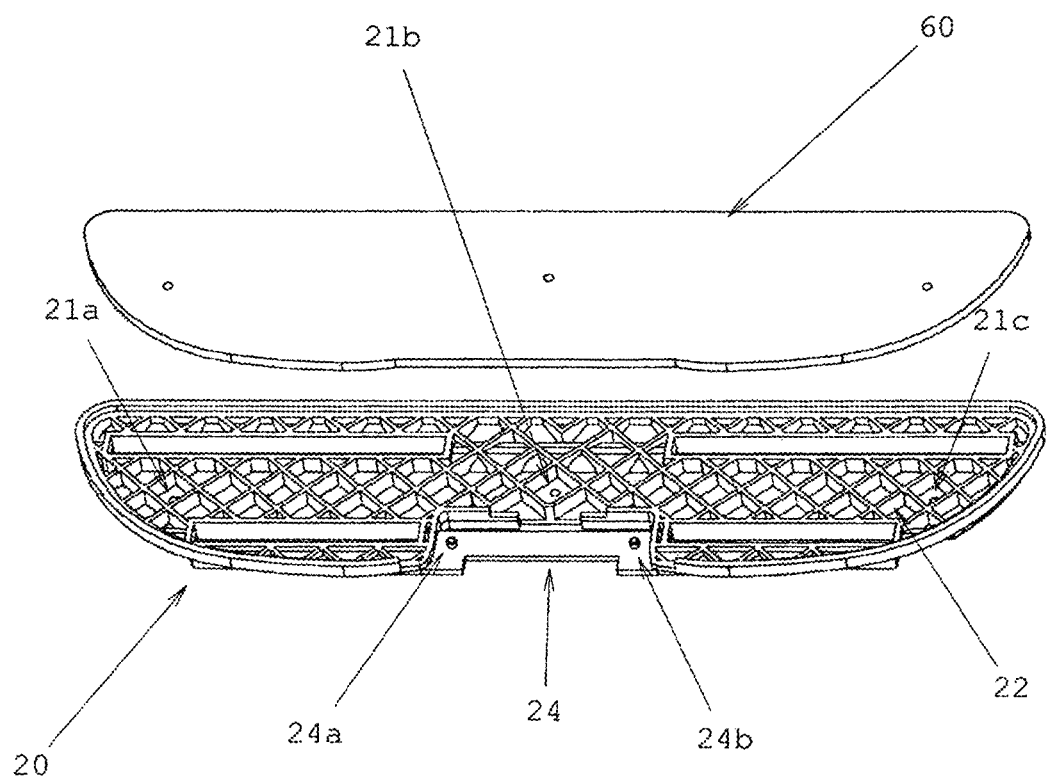
FIG. 11 is an exploded view of the pad deck internal parts: particularly the receiving platform for mating the pad deck lock and release push button and push button plate cover.
Figure 13:
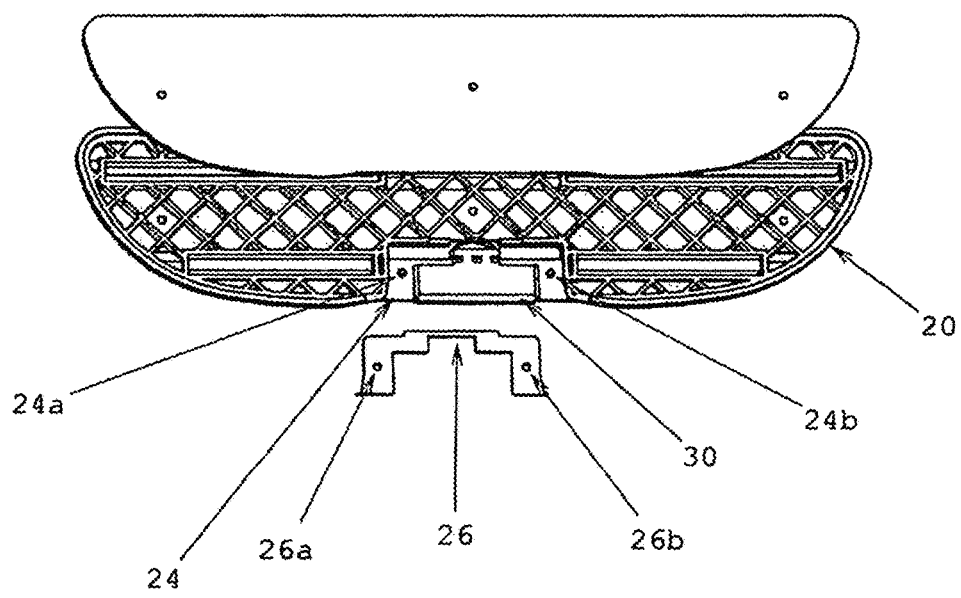
FIG. 13 is an exploded view of a pad deck assembly: particularly the elements of pad deck lock and release push button.
Figure 14:
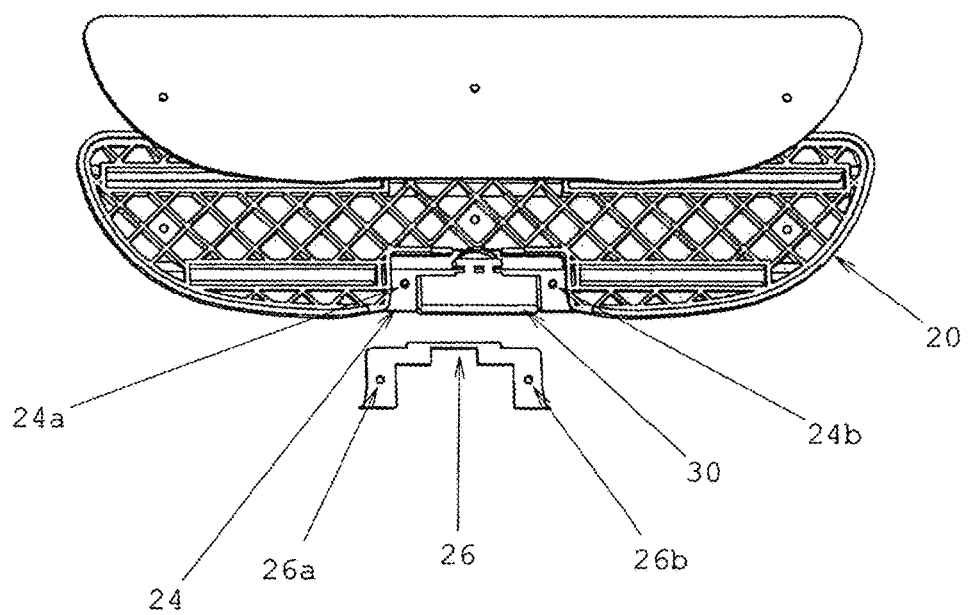
FIG. 14 is an exploded perspective view with some portions shown of the assembled parts of the push button plate cover and pad deck lock and release push button.

FIG. 11 which is an exploded view of the slidable Pad Deck 20 assembly, showing its internal elements particularly the receiving platform 24 for mating the pad deck lock and release push button 30 and push button plate cover 26. The receiving platform 24 meshed into the front frame of the slidable pad deck 20, is an area cutaway from its base frame which contains a left pin 24*a* and right pin 24*b*. The receiving platform 24 houses both the pad deck lock and release push button 30 and the push button plate cover 26 as shown in (FIGS. 12A and B & 13). The pad deck lock and release push button 30 is centrally placed between the left pin 24*a* and right pin 24*b* of the receiving platform 24. Upon placement of the pad deck lock and release push button 30 to the receiving platform 24, the overhang hinge 30*a* junctures with the embossed groove track 40*a*, connecting the grooved teeth 30*b* of the pad deck lock and release push button 30 to the grooves of the embossed grooved track 40*a*, interlocking at both ends, and sustains the spring 30*c* at the perpendicular wall base. The pad deck lock and release push button 30 is then locked into placed by conjoining the left pin 24*a* and right pin 24*b* of the receiving platform 24 to the right boring 26*b* and left boring 26*a* (FIG. 13) of the push button plate cover 26 (FIGS. 12A and 13). This connective conjoining of the elements locks the pad deck lock and release push button 30 to the receiving platform 24 by pressing down the push button plate cover 26. The conjoining of the right boring 26*b* and left boring 26*a* over the right pin 24*b* and left pin 24*a* create a secure fit (FIG. 13-14). The honey comb structure 22 of the slidable pad deck 20 provides both the extra structural reinforcement of the slidable pad deck 20 and airflow within its base frame, allowing an air cushioned effect upon the foam, thereby providing flexibility to the foam insert and pad plate covering 65.

Figure 12:
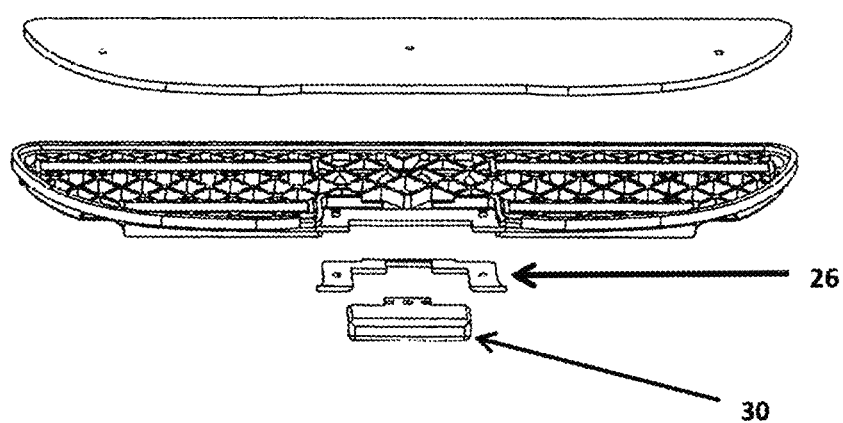
FIG. 12 A and B is an exploded perspective view of the internal pad deck assembly of its pad deck lock & release button prior to assembly to the track of the main body as configuratively shown in FIGS. 1 and 2.
Figure 12:
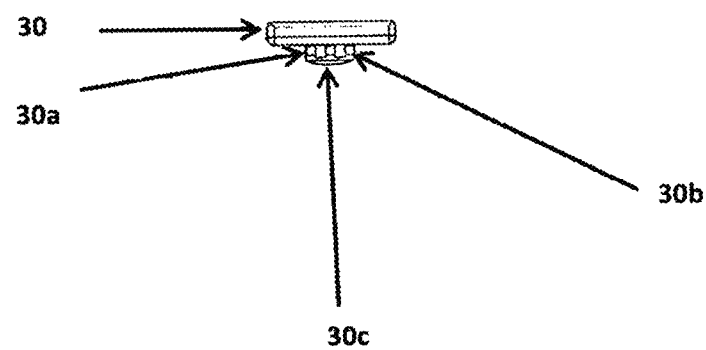

FIG. 12 A and B are an exploded perspective view of internal slidable pad deck 20 and assembly of its pad deck lock and release push button 30 to the track of the main body 1 as configuratively shown in FIGS. 1 and 2. The pad deck lock and release push button 30 contains at it front perimeter, an overhang hinge 30*a* integral to its base frame, housing grooved teeth 30*b* and a spring 30*c* for connective purposes, allowing the slidable pad deck 20 to have preset locking and unlocking positions during the slidable action atop the main body platform 40 effectuated by the release of the grooved teeth 30*b* from the embossed grooved track 40*a* (FIG. 15A and B), junctured by compressing inwardly the pad deck lock and release push button 30, effectuating the bending of the spring 30*c* and release of the grooved teeth 30*b* from the grooves of the embossed grooved track 40*a*. The Locking effect of the slidable pad deck 20 occurs when the contrary decompressing of the pad deck lock and release push button 30, allowing the spring 30*c* to reflex back to its original form, therefore engaging the grooved teeth 30*b* to interlock to the embossed grooved track 40*a*.

FIG. 13 is an exploded view of part assembly of the slidable pad deck 20 and assembly of its internal elements, with emphasis of the internal elements of the pad deck lock and release push button 30: (receiving platform 24, left pin 24*a*, right pin 24*b*, push button plate cover 26, left boring 26*a*, right boring 26*b*) as configuratively described in FIG. 11.

FIG. 14 which is an exploded perspective view of the slidable pad deck 20, showing the internal assembled parts of the Push Button Plate Cover 26 and Pad Deck Lock and Release Push Button 30 as configuratively described in FIG. 11.

FIG. 15A and B which is an exploded overlay view of grooved teeth 30*b* of the pad deck lock and release push button 30 mating to embossed grooved track 40*a* of the main body top platform 40 (FIG. 15B). The exploded view (FIG. 15B) indicates the interior elements of the pad deck lock and release push button 30 and push button plate cover 26, peeled away from the receiving platform 24, for illustrative purposes. The elements configuratively describing in FIG. 12 A and B, details its mating characteristics. The exploded overlay view (FIG. 15A) illustrates the pad deck lock and release push button 30 sits in between the left pin 24*a* and right pin 24*b* of the receiving platform 24 secured by the push button plate cover 26, locking into the described left pin 24*a* and right pin 24*b*, thereby holding in place the pad deck lock and release push button 30.

The engagement and disengagement of the grooved teeth 30*b* distal to embossed grooved track 40*a* occurs when compressing the pad deck lock and release push button 30, thrusting forward the spring 30*c* to bend against the perpendicular wall within the receiving platform 24, allowing the grooved teeth 30*b* of the overhang hinge 30*a* (FIG. 12*b*) to disengage from the embossed grooved track 40*a*, creating the unlocking features. The antithesis actions occurs when releasing pad deck lock and release push button 30, allowing the pad deck lock and release push button 30 to reset to its predisposition starting point. The spring 30*c* pushes off the perpendicular wall, allowing the reengagement of the grooved teeth 30*b* of the overhang hinge 30*a* to interlock with the embossed grooved track 40*a*, creating a locking position.

Figure 16:
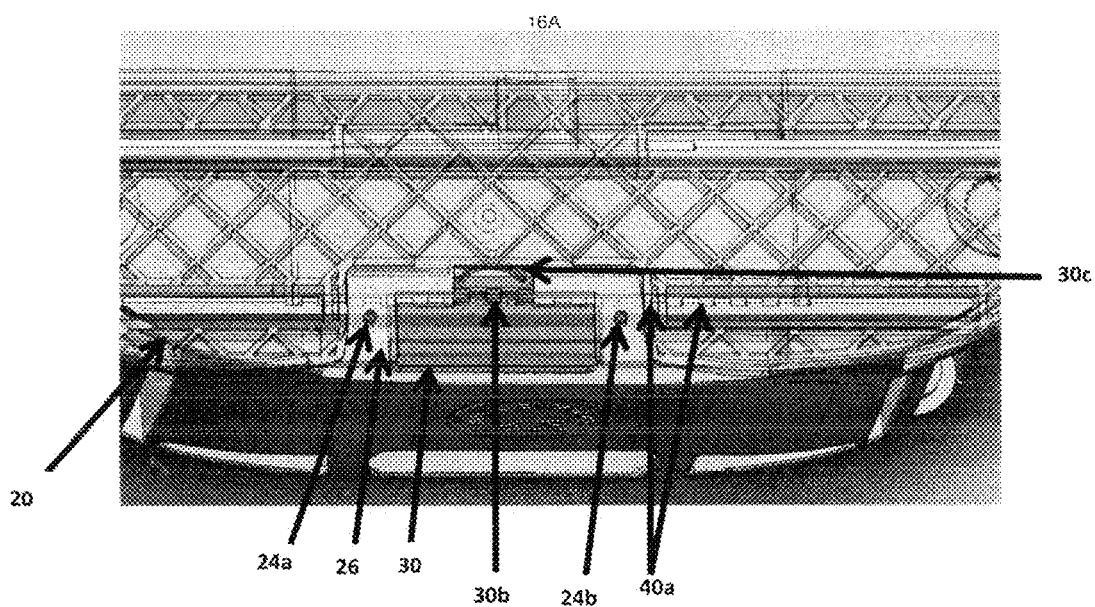
FIG. 16 is an exploded view of the internal elements of pad plate assembly to the pad deck.
Figure 16:
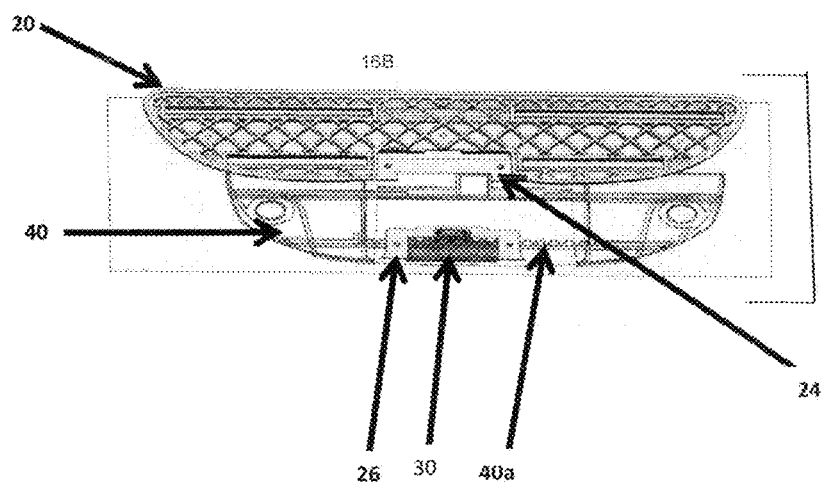

FIG. 16 which is an exploded view of internal elements of pad plate 60 and assembly to the slidable pad deck 20. The surface of the slidable pad deck 20 is ergonomically designed with prepositioned borings known as the left side boring 21*a*, middle boring 21*b*, and right side boring 21*c* (FIG. 11) mating to the left side pin 60*a*, center pin 60*b*, and right side pin 60*c* of the pad plate 60 by lining both borings to the pins and press into its connective positions.

Figure 17:
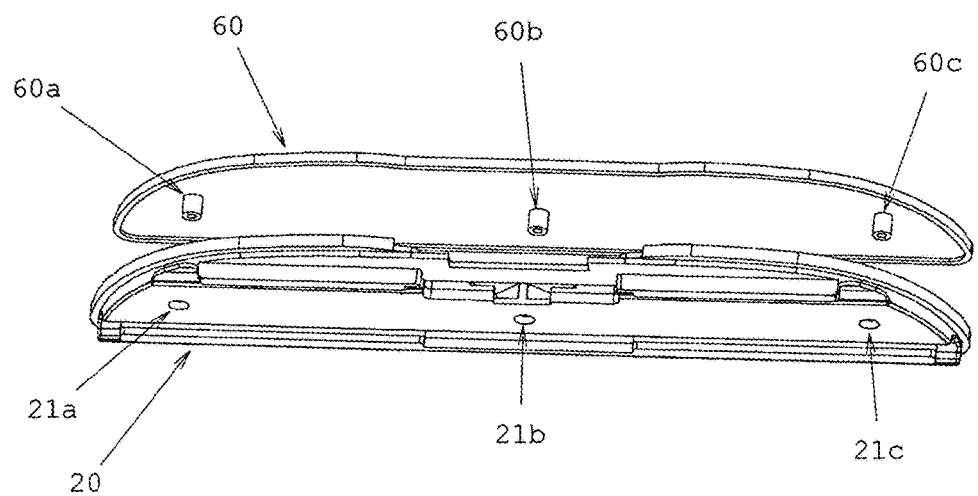
FIG. 17 is a top perspective view of a foam insert and pad plate covering.

FIG. 17 which is a top perspective view of the foam insert and pad plate covering 65. The covering to the pad plate 60 consists of a porous foam based material that is layered on top (not illustrated) to its dimension, secured either by a commercial grade adhesive or other attaching method, ensconced with an outer layer of cotton cloth, leather, or any other fiber type materials to form the foam insert and pad plate covering 65, securely tapered by tucking the ends of such materials under perimeter of the pad plate 60 either securely adhering the material by an adhesive or tightly stitching prior to attaching the left side pin 60*a*, center pin 60*b*, and right side pin 60*c* of the pad plate 60 to the left side boring 21*a*, middle boring 21*b*, and right side boring 21*c* of the slidable pad deck 20 (FIG. 12 A and B), forming the pad assembly.

Figure 18:
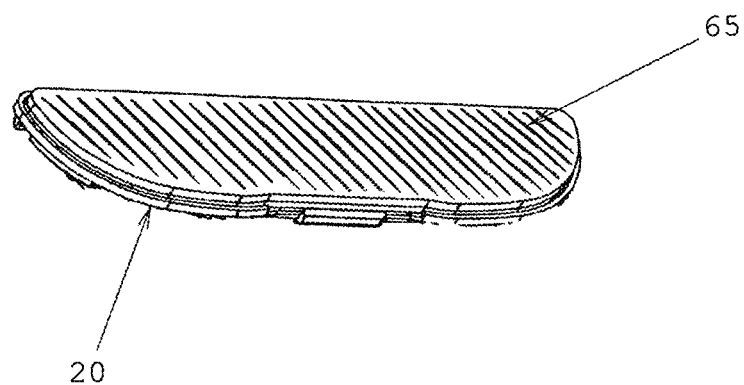
FIG. 18 is a rear perspective view of the adjustable mount/hook as shown in FIG. 1.

FIG. 18 which is a rear perspective view of the adjustable mount/hook 70 as configuratively shown in FIG. 1. The adjustable mount/hook 70 contains a rigid blade 70e, integral and molded to the base frame of the adjustable mount/hook 70, consisting of a right side wing edge 70b and left side wing edge 70a. The blade 70e secures the main body 1 to the interior door panel of any vehicle by inserting the rigid blade 70e between the rubber strip and glass window of a vehicle's inner door panel housing, creating a secure fit. The right side wing edge 70b and left side wing edge 70a provide additional support to stabilize the main body 1 and its attached elements by distributing the weight, supported across the plane of the adjustable mount/hook 70. The recessed pit 70d, atop the base of the adjustable mount/hook 70 provides the end user to easily have their finger access the push button 51a (FIG. 21) located in between the elongated opening of the recessed pit 70d.

Figure 20:
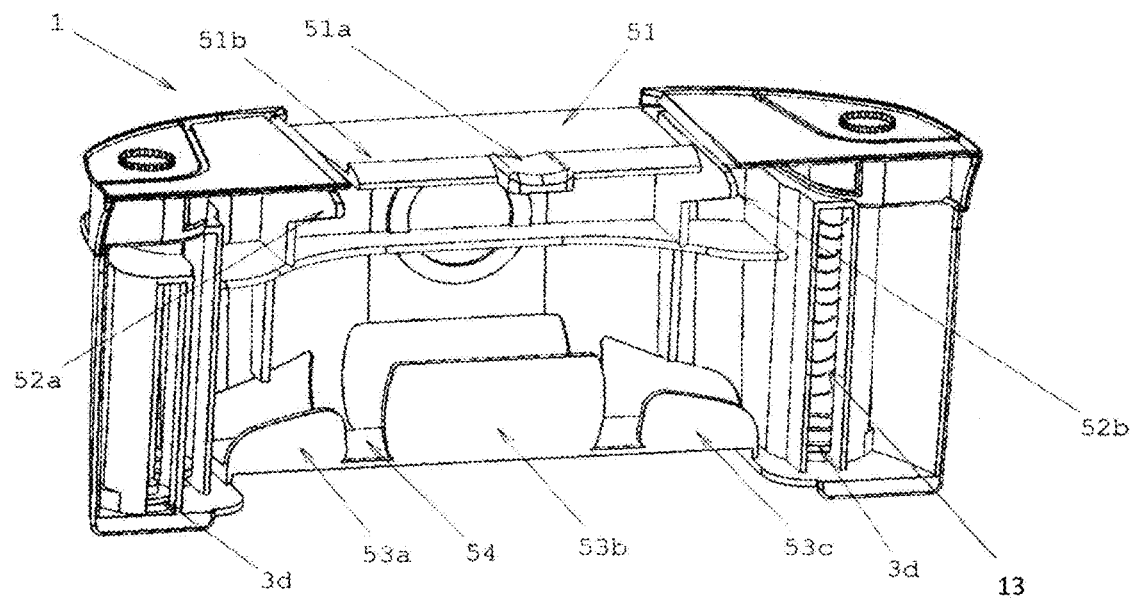
FIG. 20 is a perspective offset view of the bending plate with emphasis of the flange shown in FIG. 20 without overlay of embossed grooved and non-grooved tracking.
Figure 21:
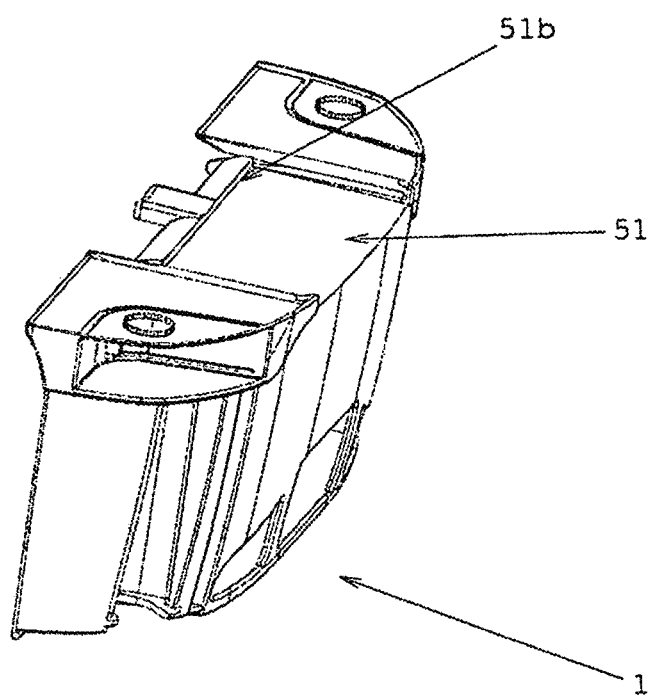
FIG. 21 is a side perspective view of the main body with a broken view of the main body top platform, illustrating the adjustable mount hook to the bending plate co-components without the overlay of the embossed grooved and non-grooved tracking.
Figure 22:
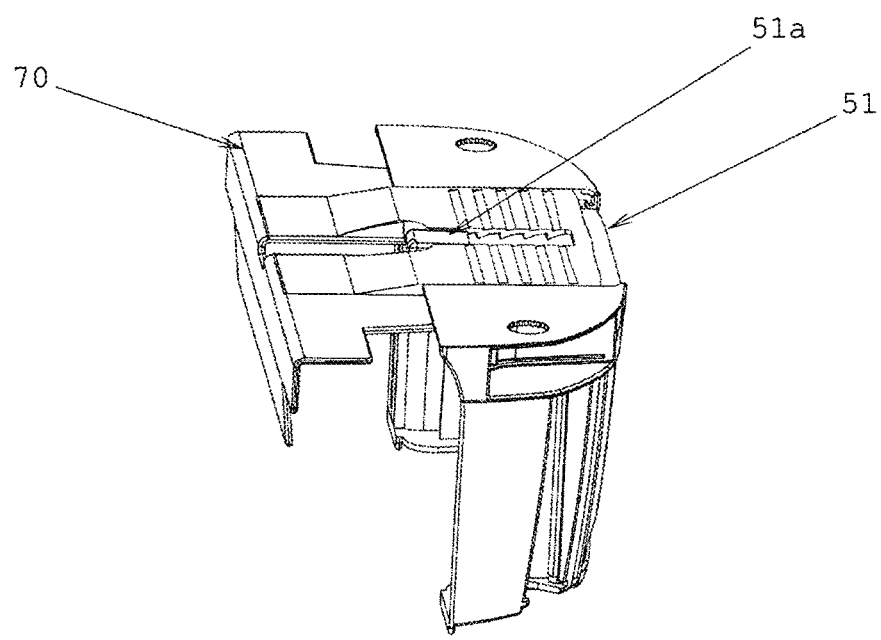
FIG. 22 is a perspective view of the adjustable mount/hook attached to bending plate with platform shown.
Figure 23:
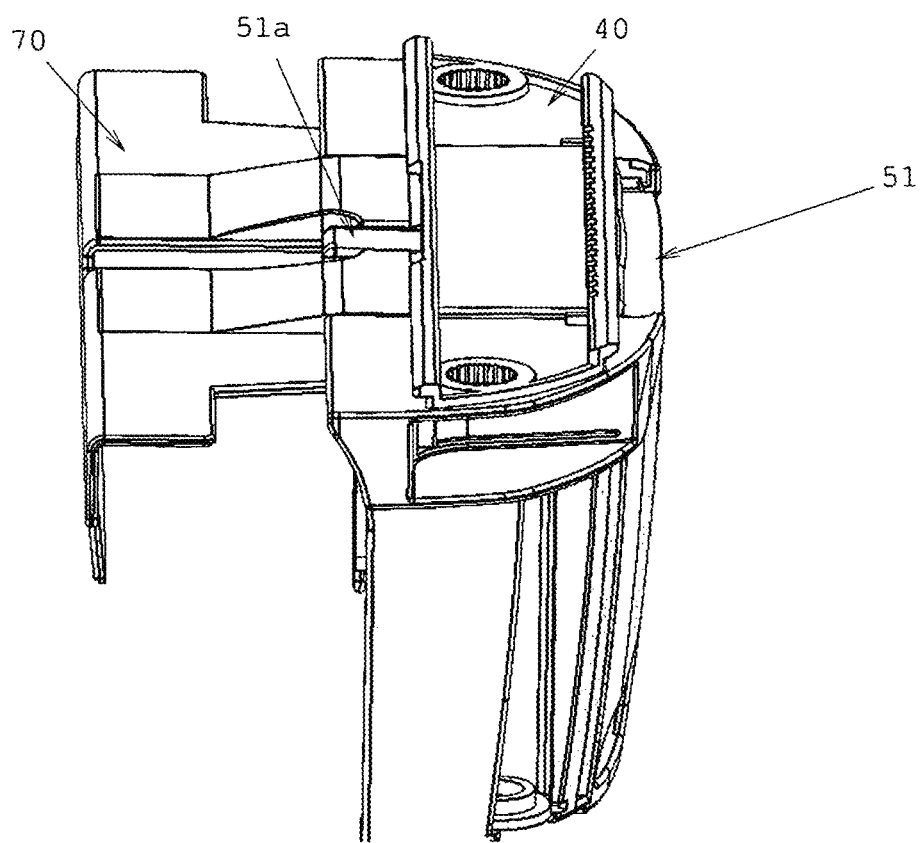
FIG. 23 is a rear perspective view of the adjustable mount/hook mating to bending plate.
Figure 24:
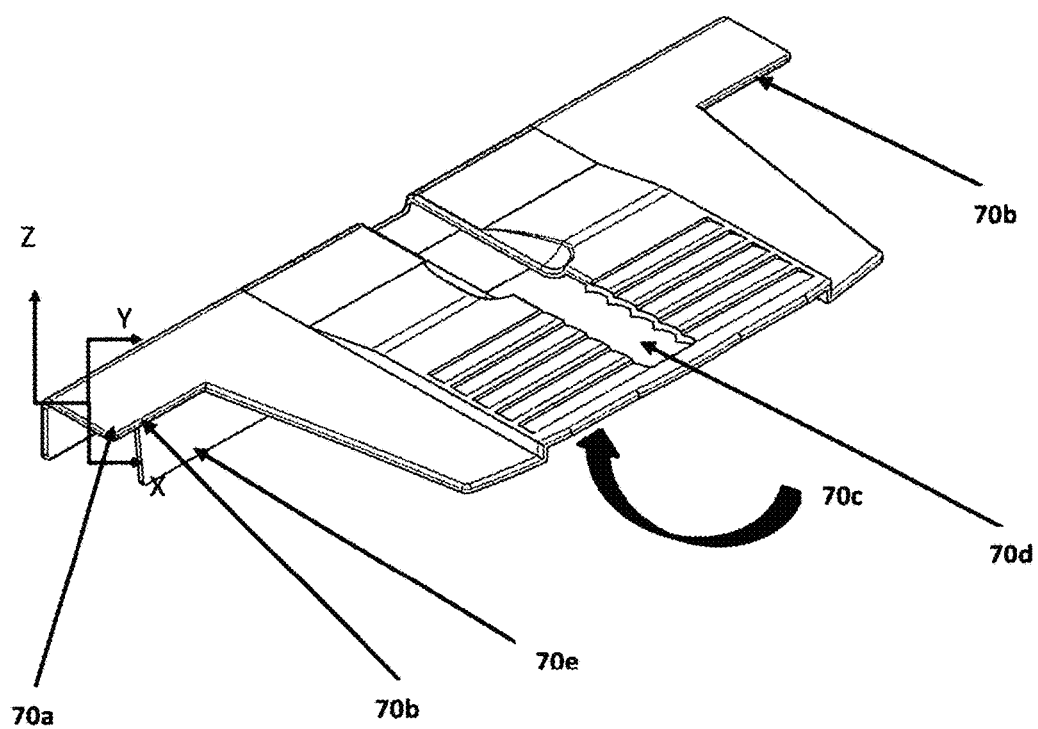
FIG. 24 is a left elevation view illustrating the axis points for clarity of the claims
Figure 25:
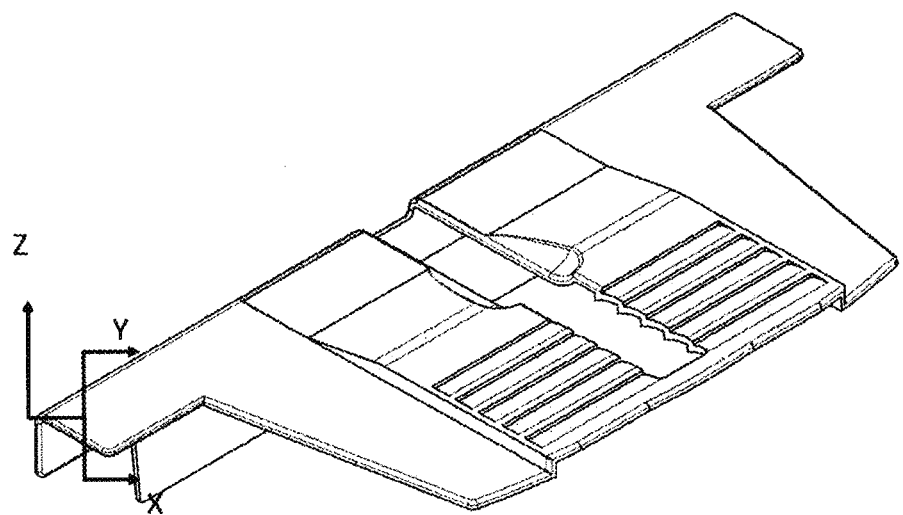

FIG. 21 which is a rear perspective with top offset view of the main body 1. This view shows the removal of both the connective slidable pad deck 20 and main body top platform 40 to illustrate internal molded parts of the main body 1 which contains elements for connecting the adjustable mount/hook 70 to the main body 1. The main body 1 has configuratively a molded bending plate 51 atop its base frame, housed underside its main body top platform 40 (FIGS. 22 & 23), a push button 51a rigidly at its far edge comprising a flange 51b rigidly molded traversely, allowing the push button 51a to show through the elongated opening of the recessed pit 70d (FIG. 21) upon the connection of the adjustable mount/hook 70 (FIGS. 21 & 22). There are two support columns rigidly molded into the main body 1: the left side buttressed parallel support column 52a and right side buttressed parallel support column 52b, allowing the adjustable mount/hook 70 to attach to the main body 1 by stabilizing and resting the adjustable mount/hook 70 upon such support columns. Sliding the adjustable mount/hook 70 in the area between the left side buttressed parallel support column 52a and right side buttressed parallel support column 52b within the underside of the main body top platform 40 (FIGS. 22 & 23), allows the adjustable mount/hook 70 to remain connected to the main body 1 and engage with the flange 51b. The flange 51b of the bending plate 51 (FIG. 20) interconnects to the configuratively molded locking teeth 70c, underside the adjustable mount/hook 70 (FIG. 23), to allow the preposition adjustments of the adjustable mount/hook 70, thereby allowing a universal attachment to all dimensionally configured vehicle door panels. Compressing and holding down the push button 51a causes the bending plate 51 to flex (FIG. 21, 22, 23) thereby releasing the flange 51b from the locking teeth 70c (FIG. 23), permitting the modification of the adjustable mount/hook 70. Fine-tuning of the adjustable mount/hook 70 can be completed either by depressing the push button 51a, then pull out or pull in the main body 1 while attached to the door panel; or prior to attaching the main body 1 to a door panel, adjust the adjustable mount/hook 70 to a desired preset position while attached to the main body 1, then seamlessly insert the main body 1 and the adjustable mount/hook 70 to the door panel, and make the final adjustments. The universal vehicle armrest has the capabilities of being tempered on the door panel in variant degrees by the prepositioned teeth located on the underside of the adjustable mount/hook 70 (FIG. 23). Along the underside of the adjustable mount/hook 70, the prepositioned locking teeth 70c can either loosen or tighten the main body 1 to either provide either a tapered or non-tapered fitting. As you engage the flange 51b to the locking teeth 70c, prepositioning the locking teeth 70c to the most inner preset position to the flange 51b, tightens the mainbody 1 to the door panel, providing little agility in movement and symbiotically allows the entire pad assembly located on the slidable pad deck 20 to rise in relation to the plane of the door panel. Contrary, prepositioning the locking teeth 70c to the most outer preset position to the flange 51b, allows the main body 1 to loosen in variant degrees, codependent on the end users adjustment, to fit less tempered, allowing the height adjustment of the slidable pad deck 20 and its entire pad assembly to lower in relation to the plane of the door panel, while holding securely the main body 1 and its exterior components. This adjustment allows for the foam insert and pad plate covering 65 (FIG. 1,2) to adjust to a height comfortable to the end user.

FIG. 20 which is a perspective offset view of the main-body top platform 40 to illustrate the bending plate 51, with emphasis of the flange 51b, as configuratively described and shown in FIG. 20.

FIG. 21 which is a side perspective view of the mainbody 1 with broken view of the mainbody top platform 40 (without overlay of the top platform 40), to illustrate the adjustable mount/hook 70 to the bending plate 51 co-component. Such illustration demonstrates the interrelationship of the push button 51a to the adjustable mount/hook 70, as configuratively described in FIG. 19.

FIG. 22 which is a perspective view of the adjustable mount/hook 70 attached to bending plate 51 with overlay of the main body top platform 40, illustrating both the location of the push button 51a and the positional relationship to the adjustable mount/hook 70, relative to the embossed grooved track 40a and embossed non grooved track 40b, as configuratively described in FIG. 19.

FIG. 23 is a rear perspective view of the adjustable mount/hook 70, illustrating its mating to bending plate 51, configuratively described in FIG. 19.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Various changes can be implemented in the preferred embodiment. The main body 1 can be configuratively changed by implementing in the design, interchangeable coin dispensers 2, of specific foreign currency, offering international marketability. Coin dispensers 2 can be redesigned to have changeable chamber that mate with its main body 1, easily removed and attached, by making design adjustments to the coin dispensers 5 shown on the main body 1. Molds for the specific coin chambers can be easily manufactured at reduced cost with the simplified interchangeable coin dispensers 5 of the main body 1.

Additional design configurations can be made to the adjustable mount/hook (70) by adding a connective adapter to allow the device to accompany various vertical height adjustments A future consideration of providing the present invention as a standard permanent option within all vehicles, an integral part of the door panel, manufactured and installed by the individual car manufacturing companies. Manufactures whom are proficient in design development will implement their skill for the consideration of applying the design of the present invention as a permanent embodiment to their standard door, allowing for all the design features and functions to be present to manufactured vehicles.

Having thus described the invention, what is desired to be protected by Letters Patent is presented in the subsequently appended claims.

What is claimed is:

1. A universal vehicle arm rest removably attached to a vehicle door having a door window sill, said arm rest being adjustable to accommodate varying shapes and sizes of door window sills of different vehicle types, said arm rest comprising an ergonomically designed main body which abuts and extends longitudinally along said door sill,
   wherein said main body has a top, an exterior side which faces said door sill, and an interior side which faces the passenger compartment of the vehicle,
   wherein said main body has a track mounted longitudinally along a top surface thereof, said track has a slidable pad deck slidably connected thereto, said slidable deck pad has an arm rest pad plate mounted thereon,
   wherein said slidable pad deck is slidable along said track for longitudinal adjustment of said arm rest pad plate relative to said main body.

2. The universal vehicle arm rest of claim 1, wherein said slidable pad deck further comprises:
   a honeycomb structure allowing air flow;
   a pair of left, middle and right side borings; and
   a pad deck including a receiving platform with proximal left and right pins, a push button plate cover with left and right borings, and a securing pad deck lock and release button;
   wherein said push button plate cover borings receive said pins and said lock and release button is operably coupled to the push button plate cover.

3. The universal vehicle arm rest of claim 2, wherein said pad plate consists of:
   a left pin, a center pin and a right pin positioned sequentially along a longitudinally central portion of said pad plate;
   a foam insert on top of said pad plate; and
   a pad plate covering which covers said foam insert and is comprised of cloth, leather or other fiber types;
   wherein said pins secure said pad plate to said main body.

4. The universal vehicle arm rest of claim 1, further comprising:
   a right track chamber and a left side track chamber attached laterally spaced along an underside of said slidable pad deck, and
   said right track chamber and said left side track chamber include laterally prepositioned left and right concealed underside hinges, respectively.

5. The universal vehicle arm rest of claim 1, wherein the main body further comprises:
   parallel embossed grooved and embossed non-grooved tracks on top of said main body comprised of:
   an embossed grooved track with prepositioned grooved teeth, and
   an embossed non-grooved track with a smooth lateral surface devoid of prepositioned grooved teeth,
   wherein the embossed grooved track and the non-grooved tracks rigidly connect prepositioned overhang hinges.

6. The universal vehicle arm rest of claim 2, wherein said pad deck lock and release button comprises: a base frame embossed with a flexible spring at the front of said base frame and an overhang hinge with pre-stationed grooved teeth at the underside of said base frame.

7. The universal vehicle arm rest of claim 1, wherein said main body comprises:
   a flexible bending plate which is integral and proximal to the top rear underside of said main body;
   a push release button housed at the furthest extent of said flexible bending plate; and
   a flange laterally positioned at a perimeter edge of said push release button.

8. The universal vehicle arm rest of claim 1, wherein said main body further comprises:
   a right side cylindrical aperture and a left side cylindrical aperture at each end of said main body having a left side recessed groove and a right side recessed groove vertically positioned within inner casings of said right side and said left side cylindrical apertures, respectively.

9. The universal vehicle arm rest of claim 1, wherein said main body further comprises:
   an ergonomically designed cylindrical cup holder which comprises in combination:
   a connective arm extension with exterior and interior inner casings,
   a peripheral ribbed edge rigidly connected at an end base of said arm extension, and
   an inner flexible arm integral with said arm extension with exterior and interior inner casings housing a hinged ribbed bottle neck at a base edge of said inner flexible arm and a center push button at a proximal center, thereof.

10. The universal vehicle arm rest of claim 1, wherein said main body further comprises:
    a left side cup holder chamber and a right side cup holder chamber, the cup holder chambers are recessed at each end to said main body proximal to side ends, the chambers comprising:
    a horizontally positioned left side buckle belt spring and a right side buckle belt spring, and locks connected to a left side and right side latch hook annexed to respective left side and right side chambers.

11. The universal vehicle arm rest of claim 1, wherein said main body further comprises:
    an adjustable mount hook,
    said mount hook having in combination:
    a geometrical plane of X, Y, and Z axis points containing a centered recessed pit along the Y and Z axis,
    a blade along the X axis, integral to the X, Z, and Y axis points,
    a plurality of locking teeth rigidly prepositioned along an underside of the plane of said adjustable mount hook, and
    a pair of left and right side wing edges along the Z axis, integral to the X and Y.

12. The universal vehicle arm rest of claim 1, wherein said main body further comprises:
    a plurality of coin dispensers which abut edges of said main body, each of said coin dispensers has a receiving mouth and a cylindrical body, each of said cylindrical bodies has a coil spring therein on top of which a puck is supported, wherein each of said cylindrical bodies are configured to receive coins which are positioned on top of said pucks.

13. The universal vehicle arm rest of claim 1, wherein said main body further comprises: an anterior tissue dispenser consisting of a left side aperture, a middle aperture, and a right side aperture in said main body.

14. The universal vehicle arm rest of claim 1, wherein said main body further comprises:
    a main body frame connected to a back end compartment, said compartment comprising:
    a tissue compartment storage platform with a left, a center and a right side support wall base scaffold wall base including right and left side buttressed parallel support columns.

* * * * *